United States Patent
Lu (10) Patent No.: US 10,254,495 B2
(45) Date of Patent: Apr. 9, 2019

(54) FIBER OPTIC CONNECTOR AND CABLE ASSEMBLY HAVING A FIBER LOCKING MECHANISM

(71) Applicant: COMMSCOPE TECHNOLOGIES LLC, Hickory, NC (US)

(72) Inventor: Yu Lu, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/353,206

(22) Filed: Nov. 16, 2016

(65) Prior Publication Data

US 2017/0192190 A1 Jul. 6, 2017

Related U.S. Application Data

(63) Continuation of application No. 14/490,219, filed on Sep. 18, 2014, now Pat. No. 9,500,816, which is a continuation of application No. 13/552,856, filed on Jul. 19, 2012, now Pat. No. 8,864,391.

(60) Provisional application No. 61/526,996, filed on Aug. 24, 2011, provisional application No. 61/510,888, filed on Jul. 22, 2011.

(51) Int. Cl.
*G02B 6/38* (2006.01)
*G02B 6/44* (2006.01)
*G02B 6/36* (2006.01)

(52) U.S. Cl.
CPC .............. *G02B 6/4434* (2013.01); *G02B 6/36* (2013.01); *G02B 6/3821* (2013.01); *G02B 6/3826* (2013.01); *G02B 6/3869* (2013.01); *G02B 6/3885* (2013.01); *G02B 6/3887* (2013.01); *G02B 6/3893* (2013.01)

(58) Field of Classification Search
CPC .. G02B 6/3821; G02B 6/3869; G02B 6/3885; G02B 6/3887; G02B 6/3893
USPC ............................................................. 385/78
See application file for complete search history.

(56) References Cited

U.S. PATENT DOCUMENTS

| 5,044,722 A | * | 9/1991 | Voser | G02B 6/4422 385/113 |
| 5,214,730 A | | 5/1993 | Nagasawa et al. | |
| 5,673,352 A | | 9/1997 | Bauer et al. | |

(Continued)

OTHER PUBLICATIONS

ADC Telecommunications, Inc., Indoor Fiber Distribution Terminals—CPE, at www.adc.com/productandservices (undated).

(Continued)

*Primary Examiner* — Jerry Blevins
(74) *Attorney, Agent, or Firm* — Merchant & Gould P.C.

(57) ABSTRACT

The present disclosure relates to a fiber optic connector and cable assembly. The fiber optic connector and cable assembly includes a fiber optic connector, a fiber optic cable, and an anchoring mechanism. The fiber optic connector includes a connector housing and a ferrule assembly having a ferrule and a spring. The fiber optic cable includes at least one optical fiber contained within a cable jacket and at least one strength structure for providing tensile reinforcement to the fiber optic cable. The fiber optic cable is attached to the fiber optic connector and the at least one optical fiber runs from the fiber optic cable through a total length of the fiber optic connector. The anchor mechanism anchors the at least one optical fiber to at least one of the cable jacket and the at least one strength structure.

19 Claims, 7 Drawing Sheets

(56) References Cited

U.S. PATENT DOCUMENTS

| | | |
|---|---|---|
| 6,227,719 B1 * | 5/2001 | Aoki .................... G02B 6/3825 385/59 |
| 6,493,491 B1 | 12/2002 | Shen et al. |
| 6,542,674 B1 | 4/2003 | Gimblet |
| 6,546,175 B1 | 4/2003 | Wagman et al. |
| 7,090,407 B2 | 8/2006 | Melton et al. |
| 7,113,679 B2 | 9/2006 | Melton et al. |
| 7,264,402 B2 | 9/2007 | Theuerkorn et al. |
| 7,400,814 B1 | 7/2008 | Hendrickson et al. |
| 7,454,106 B2 | 11/2008 | Cobb, III et al. |
| 7,463,803 B2 | 12/2008 | Cody et al. |
| 7,522,806 B2 | 4/2009 | Hendrickson et al. |
| 7,572,065 B2 | 8/2009 | Lu et al. |
| 7,621,675 B1 | 11/2009 | Bradley |
| 7,744,288 B2 | 6/2010 | Lu et al. |
| 7,840,109 B2 | 11/2010 | Lu et al. |
| 8,041,166 B2 | 10/2011 | Kachmar |
| 8,070,367 B2 | 12/2011 | Winberg et al. |
| 8,290,320 B2 | 10/2012 | Kachmar |
| 8,548,293 B2 | 10/2013 | Kachmar |
| 8,636,425 B2 | 1/2014 | Nhep |
| 8,864,391 B2 | 10/2014 | Lu |
| 9,500,816 B2 | 11/2016 | Lu |
| 2005/0100303 A1 * | 5/2005 | Cox ..................... G02B 6/3887 385/136 |
| 2006/0198585 A1 * | 9/2006 | Keller .................. G02B 6/441 385/107 |
| 2006/0291787 A1 | 12/2006 | Seddon |
| 2008/0175541 A1 * | 7/2008 | Lu ....................... G02B 6/3816 385/62 |
| 2009/0136184 A1 | 5/2009 | Abernathy et al. |
| 2009/0148101 A1 | 6/2009 | Lu et al. |
| 2009/0269014 A1 * | 10/2009 | Winberg ............. G02B 6/3846 385/78 |
| 2009/0297104 A1 | 12/2009 | Kachmar |
| 2011/0286708 A1 | 11/2011 | Lu et al. |

OTHER PUBLICATIONS

Corning Cable Systems, Wall-Mountable Connector Housings (WCH), at www.corningcablesystymes.com (undated).
International Search Report and Written Opinion for PCT/US2012/047402 dated Jan. 17, 2013.
Multilink, Inc., (2007) Multilink Catalog, vol. 24, pp. 87-89.
European Search Report for Application No. 12817330.9 dated Feb. 20, 2015.

* cited by examiner

FIBER OPTIC CONNECTOR AND CABLE ASSEMBLY HAVING A FIBER LOCKING MECHANISM

RELATED APPLICATIONS

This application claims the benefit of U.S. Non-Provisional Patent Application No. 14/490,219, filed Sep. 18, 2014, now issued U.S. Pat. No. 9,500,816, issued Nov. 22, 2016, entitled "FIBER OPTIC CONNECTOR AND CABLE ASSEMBLY HAVING A FIBER LOCKING MECHANISM" which claims the benefit of U.S. Non-Provisional Patent Application No. 13/552,856, filed Jul. 19, 2012, U.S. Pat. No. 8,864,391, issued Oct. 21, 2014, entitled "FIBER OPTIC CONNECTOR AND CABLE ASSEMBLY HAVING A FIBER LOCKING MECHANISM" which claims the benefit of U.S. Provisional Application No. 61/526,996, filed Aug. 24, 2011, entitled "FIBER OPTIC CONNECTOR AND CABLE ASSEMBLY HAVING A FIBER LOCKING MECHANISM" and U.S. Provisional Application No. 61/510,888, filed Jul. 22, 2011, entitled "FIBER OPTIC CONNECTOR AND CABLE ASSEMBLY HAVING A FIBER LOCKING MECHANISM" which applications are hereby incorporated herein by reference.

TECHNICAL FIELD

The present disclosure relates generally to optical fiber communication systems. More particularly, the present disclosure relates to the anchoring of one or more fibers within a fiber optic cable used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

A fiber optic connector is often secured to the end of a corresponding fiber optic cable by anchoring strength structures of the cable to the connector housing of the connector. Anchoring is typically accomplished through the use of conventional techniques such as crimps or adhesive. Anchoring the strength structures of the cable to the connector housing is advantageous because it allows tensile load applied to the cable to be transferred from the strength structures of the cable directly to the connector housing. In this way, the tensile load is not transferred to the ferrule assembly of the fiber optic connector. If the tensile load were to be applied to the ferrule assembly, such tensile load could cause the ferrule assembly to be pulled in a proximal direction against the bias of the connector spring thereby possibly causing an optical disconnection between the connector and its corresponding mated connector. Fiber optic connectors of the type described above can be referred to as pull-proof connectors.

SUMMARY

One aspect of the present disclosure relates to an anchor mechanism for anchoring at least one optical fiber to at least one of a strength structure and a cable jacket having features that facilitate connection reliability and reliable optical performance.

In part, this disclosure describes a fiber optic connector and cable assembly. The fiber optic connector and cable assembly include a fiber optic connector, a ferrule assembly, one or more optical fibers contained within a cable jacket, and an anchor mechanism. The fiber optic connector includes a connector housing having a distal end and a proximal end. The fiber optic connector further includes a ferrule assembly having a ferrule and a spring. The ferrule has a distal end face that is accessible at the distal end of the connector housing. The spring is between the distal end and the proximal end of the connector housing. The spring biases the ferrule in a distal direction relative to the connector housing. The ferrule is movable in a proximal direction relative to the fiber optic connector from a distal position to a proximal position. The distal position and the proximal position are separated by an axial displacement distance. A proximal movement of the ferrule is against a bias of the spring. The fiber optic cable also includes at least one strength structure that provides tensile reinforcement to the fiber optic cable. The at least one strength structure is anchored to the connector housing adjacent the proximal end of the connector housing. The at least one optical fiber extends through a fiber passage of the fiber optic connector from the proximal end of the connector housing to the ferrule. The at least one optical fiber has a distal portion potted within the ferrule. The anchor mechanism anchors the at least one optical fiber to at least one of a cable jacket and at least one strength structure.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
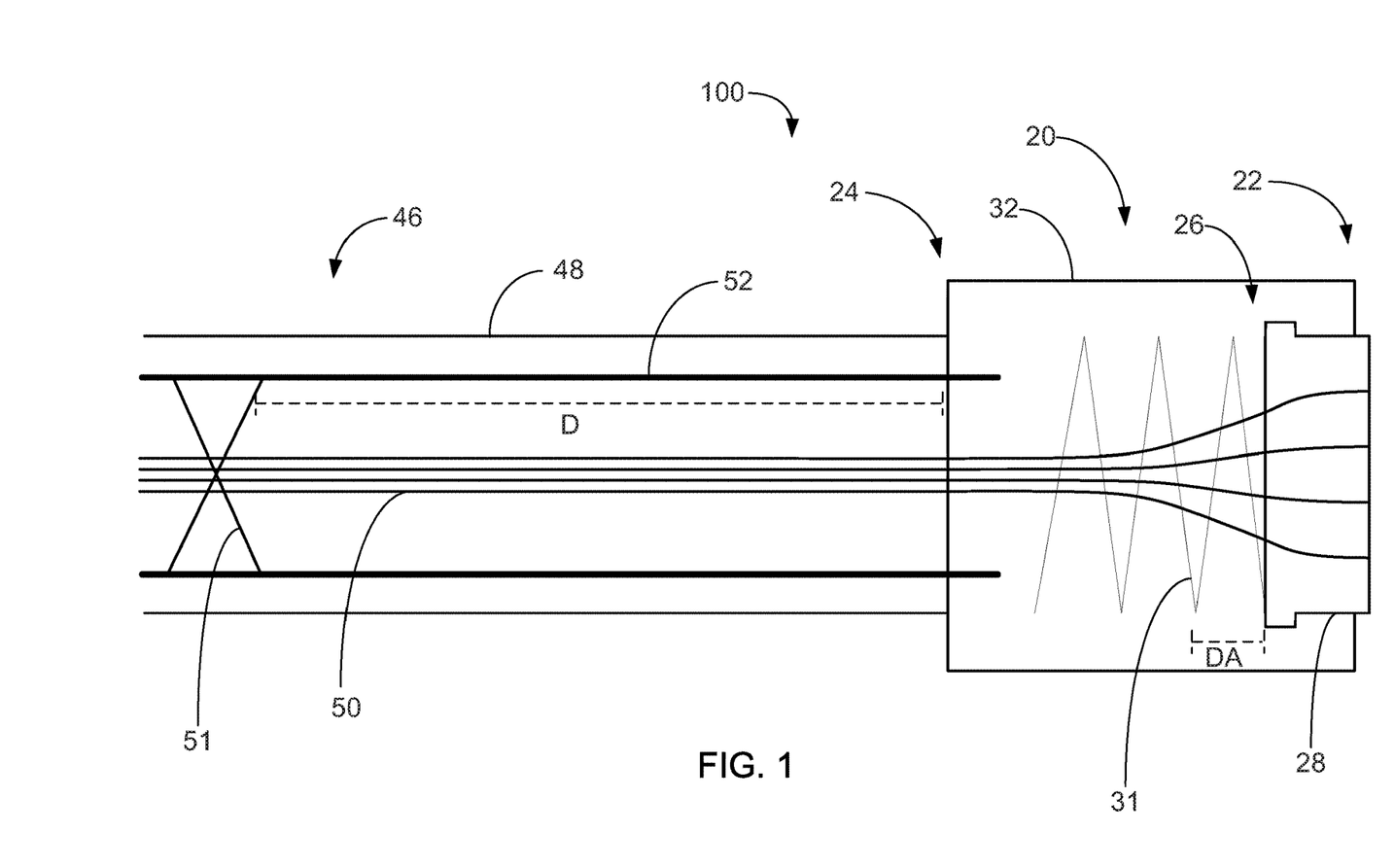
FIG. 1 is a schematic section view of an embodiment of a fiber optic cable and fiber optic connector in accordance with the principles of the present disclosure.

FIG. 1 illustrates a first fiber optic connector 20 connected to a fiber optic cable 46 to form a fiber optic connector and cable assembly 100 in accordance with the principles of the present disclosure. The fiber optic connector 20 has a connector housing 32 that extends from a distal end 22 of the fiber optic connector 20 to a proximal end 24 of the fiber optic connector 20. The fiber optic connector 20 includes a ferrule assembly 26 that mounts adjacent the distal end 22 of the connector housing 32. The ferrule assembly 26 includes a ferrule 28, a hub and a spring 31. The ferrule assembly 26 mounts at least partially within the fiber optic connector 20. The proximal end 24 of the fiber optic connector 20 is configured to receive, anchor and provide strain relief/bend radius protection to a fiber optic cable 46.

The fiber optic cable 46 includes a cable jacket 48 surrounding at least one optical fiber 50 that is locked into place with an anchor mechanism 51. The fiber optic cable 46 also includes at least one strength structure 52 formed by one or more strength members (e.g., reinforcing fibers such as aramid yarn/Kevlar). In some embodiments, the anchor mechanism 51, is any suitable device, system, or mechanism for anchoring the at least one optical fiber 50 either directly to the at least one strength structure 52 or indirectly to the at least one strength member 52 through an intermediate structure, such as the cable jacket 48. Accordingly, the anchor mechanism 51 anchors the at least one optical fiber 50 relative to the at least one strength structure 52. In an alternative embodiment, the anchor mechanism 51 is any suitable device, system, or mechanism for anchoring the at least one optical fiber 50 to the cable jacket 48.

For example, at the anchor location, the anchor mechanism 51 prevents relative axial movement between the at least one strength member 52 and the at least one optical fiber 50. In some embodiments, when the at least one optical fiber 50 is indirectly anchored to the at least one strength member 52 by the anchor mechanism 51, the anchor mechanism 51 prevents relative axial movement at the anchor location between the at least one optical fiber 50, the at least one strength member 52, and the intermediate structure. Accordingly, the anchor mechanism 51 provides for connection reliability and reliable optical performance. Preferably, the anchor mechanism 51 is positioned at a fiber anchoring location that is not at or co-extensive with an optical fiber splice location.

FIGS. 1-5 illustrate example embodiments of a fiber optic cable 46. FIG. 1 illustrates an embodiment of a fiber optic cable 46 with four optical fibers 50. It is appreciated that any number of optical fibers 50, such as 1, 4, 8, 12, or etc., may be utilized by the present disclosure. The fiber optic cable 46 also includes at least one strength structure 52 formed by one or more strength members (e.g., reinforcing fibers such as aramid yarn/Kevlar). FIG. 1 illustrates an example embodiment of two strength structures 52. It is appreciated that any number of strength structures 52, such as 1, 2, 3, 4, or etc., may be utilized by the present disclosure. In some embodiments, not illustrated, the at least one strength structure 52 is a strength layer formed around the at least one optical fiber 50. The at least one optical fiber 50 is routed through an open space in the total length of the fiber optic cable 46 and through a fiber passage in the total length of the fiber optic connector 20. The at least one optical fiber 50 further includes a distal portion secured within the ferrule 28. Further details regarding a fiber optic cable are found in U.S. application Ser. No. 12/607,748, filed on Oct. 10, 2009, which is hereby incorporated by reference in its entirety.

It will be appreciated that the fiber optic connector 20 is adapted to be mechanically coupled to a like fiber optic connector by an intermediate fiber optic adapter. Further details regarding the fiber optic adapter are found in U.S. Pat. No. 5,214,730, which is hereby incorporated by reference in its entirety.

Referring to FIG. 1, the ferrule 28 of the ferrule assembly 26 includes a distal end face and a proximal end face. The distal end face of the ferrule 28 is positioned distally outwardly beyond a distal end 22 of the connector housing 32 and the proximal end face of the ferrule 28 is positioned within the connector housing 32. When the connector housing 32 is assembled as shown at FIG. 1, the ferrule hub and the spring 31 are captured between the distal end 22 and the proximal end 24 of the connector housing 32. As so configured, the spring 31 is configured to bias the ferrule 28 in a distal direction relative to the connector housing 32. Accordingly the ferrule 28 is movable in a proximal direction relative to the fiber optic connector 20 from a distal position to a proximal position. The distal position and the proximal position are separated by an axial displacement distance AD. Thus, the proximal movement of the ferrule 28 is against a bias of the spring 31. When two of the fiber optic connectors 20 are interconnected, their ferrules 28 are forced to move in proximal directions relative to their respective connector housings 32 against the bias of their respective springs 31. The movement is along the central axes of the mated fiber optic connectors 20.

The at least one strength structure 52 provides tensile reinforcement to the fiber optic cable 46. In addition to providing tensile strength to the fiber optic cable 46, in some embodiments, the at least one strength structure 52 also functions as a separator for separating the at least one optical fiber 50 from the cable jacket 48. For example, in some embodiments, the at least one strength member 52 is positioned between the at least one optical fiber 50 and the jacket 48. In some embodiments, the at least one strength structure 52 is attached to the cable jacket 48. In other embodiments, the at least one strength structure 52 is not attached to the jacket 48 and slides within the cable jacket 48. Further details regarding the strength structure are found in U.S.

Patent Application Publication No. 2009/0297104, filed on May 28, 2009, which is hereby incorporated by reference in its entirety.

As discussed above, in some embodiments, the anchor mechanism 51, is any suitable device, system, or mechanism for anchoring the at least one optical fiber 50 relative to the at least one strength structure 52. For example, the anchor mechanism 51 either directly anchors the at least one optical fiber 50 to the at least one strength member 52 or indirectly anchors the at least one optical fiber 50 to the at least one strength member 52 through an intermediate structure. In one embodiment, when the at least one strength structure 52 is attached to the cable jacket 48, the anchor mechanism 51 anchors the at least one optical fiber 50 to the cable jacket 48 and/or the strength structure 52. In another embodiment, when the at least one strength structure 52 is not attached to the cable jacket 48, the anchor mechanism 51 anchors the at least one optical fiber 50 to the at least one strength structure 52. As discussed above, in alternative embodiments, the anchor mechanism 51, is any suitable device, system, or mechanism for anchoring the at least one optical fiber 50 to the cable jacket 48.

As shown in FIG. 1, the at least one optical fiber 50 extends through a fiber passage extending the total length of the fiber optic connector 20. For example, the at least one optical fiber 50 extends through the connector housing 32 and the ferrule 28. In certain embodiments, a portion of the at least one optical fiber 50 extending proximally from the ferrule 28 through the fiber optic connector 20 to the jacketed portion of the fiber optic cable 46 includes a core, cladding layer and one or more coating layers. In some embodiments, the portion of the at least one optical fiber 50 extending through the ferrule 28 includes the core and the cladding layer.

The fiber optic connector 20 is a pull-proof connector in which the at least one strength structure 52 of the fiber optic cable 46 is anchored to the connector housing 32 thereby preventing tensile loads from being transferred to the ferrule assembly 26. Because of this configuration, movement of the ferrule 28 in a proximal direction relative to the connector housing 32 causes the at least one optical fiber 50 to be forced/displaced in a proximal direction relative to the connector housing 32 and the jacket 48 of the fiber optic cable 46. In the depicted embodiment, the ferrule 28 has a maximum axial displacement AD in the proximal direction during the connection process. The axial displacement AD creates an excess length of fiber having a length equal to the length of the axial displacement AD.

The at least one optical fiber 50 can also be affected and/or displaced by axial stretching, axial pulling, axial shrinking, axial shortening, and/or coiling of the jacket 48 of the fiber optic cable 46.

Absent the anchor mechanism 51, axial elongation of the jacket 48 can cause tension to be transferred to the one or more optical fibers 50 causing the one or more optical fibers 50 to pull back on the ferrule 28 against the bias of the spring 31. With the ferrule 28 pulled back, the ability to provide an effective optical connection with another optical connector can be compromised. In the case of multi-fiber ferrules, the pull back force transferred from the optical fibers 50 to the ferrule 28 can easily overcome the spring load of the spring 31 without exceeding the breaking points of the individual optical fibers 50. Absent the anchor mechanism 51, axial shrinking/shortening of the jacket 48 caused by temperature variations or coiling of the cable can cause excess optical fiber length to be forced inside the connector 20 thereby causing microbending of the optical fibers 50 and signal degradation.

With regard to the undesirable movement of the ferrule 28 and the at least one fiber as described above, the anchor mechanism 51 of the present disclosure lessens and/or prevents this undesirable movement of the ferrule 28 and the at least one optical fiber 50. Accordingly, the anchor mechanism 51 described herein provides for a fiber optic connector and cable assembly 100 that has more reliable connections and more reliable optical performance than previously utilized fiber optic cable and connector assemblies that do not utilize an anchor mechanism 51.

As discussed above, the anchor mechanism 51 may be any suitable device, system, or mechanism for anchoring the at least one optical fiber 50 into place within the fiber optic cable 46. The anchor mechanism 51 prevents an axial load on the at least one optical fiber 50 from transferring through the at least one optical fiber 50 in either direction across the anchor mechanism 51. The prevention of load transfer, prevents any optical fiber movement within the open space of the fiber optic cable 46 from being transferred to the distal end of the at least one optical fiber 50 that is secured to the ferrule 28. However, the prevention of load transfer will also prevent movement of the at least one optical fiber 50 cause by any axial displacement of the ferrule 28 from being transferred across the anchor mechanism 51.

Accordingly, the location of the anchor mechanism 51 in the fiber optic cable 46 is located at a predetermined distance D from the proximal end 24 of the connector housing 32. The predetermined distance D is enough distance to accommodate acceptable macrobending of the at least one optical fiber 50 in response to the axial displacement AD of the ferrule 28. Further, the fiber optic cable 46 has a diameter that is large enough to take-up an excess length of the at least one optical fiber 50 that corresponds to the axial displacement distance of the ferrule 28 to accommodate for acceptable macrobending of the at least one optical fiber 50.

For example, the predetermined distance D may be adjacent to the fiber optic connector 20 if the fiber optic connector 20 itself includes an internal fiber take-up region (e.g., see the fiber optic connector disclosed in U.S. patent application Ser. No. 13/420,286, entitled Fiber Optic Connector that claims priority to U.S. Provisional Patent Application having and Application Ser. No. 61/510,711, filed on the date concurrent herewith, which are both hereby incorporated by reference in their entirety. However, if the fiber optic connector 20 does not include a fiber take-up region, the predetermined distance D preferably provides enough space within the fiber optic cable 46 to accommodate acceptable macrobending of the at least one optical fiber 50 in response to the axial displacement AD of the ferrule 28. In some embodiments, the predetermined distance is from about 5 inches to about 3 feet. In some embodiments, the predetermined distance is from about 6 inches to about 1.5 feet. In further embodiments, the predetermined distance is from about 1 foot to about 2 feet. In further embodiments, the predetermined distance is from about 1 foot. In other embodiments, the predetermined distance is from about 1.5 feet to about 2.5 feet.

In some embodiments, the anchor mechanism 51 is an adhesive, a curable substance, and/or a securing medium, such as epoxy. In some embodiments, the adhesive is injected with a needle through the cable jacket 48 into the open space of the fiber optic cable 46. In other embodiments, a cable jacket 48 is cut open to create an open window 60 through which the adhesive is applied to the at least one optical fiber 50. In these embodiments, the open window 60 may be sealed by utilizing a heat shrink wrap applied over the cable jacket 48.

In other embodiments, the anchor mechanism 51 is a permanently deformed portion of the cable jacket 48 that has been deformed by a hot press of the cable jacket 48 to lock the at least one optical fiber 50 in place within the fiber optic cable 46. In other embodiments, the anchor mechanism 51 is a heat shrink wrap or crimp applied over the cable jacket 48 to compress the cable jacket 48 to lock the at least one optical fiber 50 in place within the fiber optic cable 46.

In some embodiments, the anchor mechanism 51 includes a locking device such as a clip or retainer secured to the inside of the jacket 48. The locking device can be placed at least partially inside the fiber optic cable 46 through an open window 60 in the jacket 48. The locking device is a solid structure located at least partially within the jacket 48 and holds or locks the at least one fiber in place relative to the at least one strength structure 52, such as a clip. The locking device may include a biasing member and/or one or more catches 54 for locking the clip or crimp into place within the open space of the fiber optic cable 46. The catches 54 inhibit axial movement of the locking devices relative to the at least one strength structure 52. In some embodiments, the anchor mechanism 51 utilizes an adhesive in addition to the locking device. The locking devices can include receptacles (e.g., channels, openings, pockets, etc.) for receiving the optical fibers 50. Adhesive can be used to anchor the optical fibers 50 within the receptacles. As discussed above, in some embodiments, the open window 60 is sealed by utilizing a heat shrink layer around the fiber optic cable 46 to seal off the open window 60.

Figure 2:
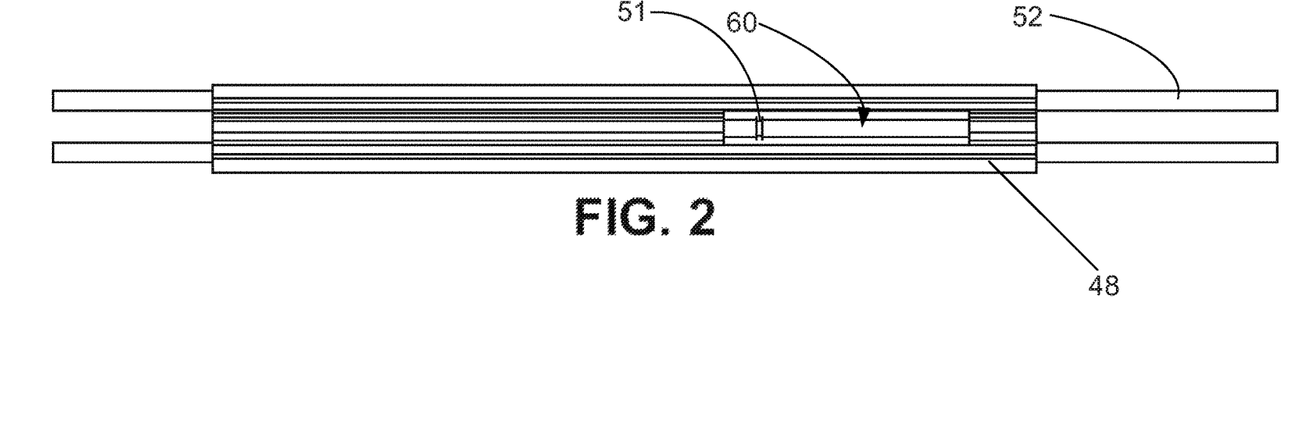
FIG. 2 is a top view of an embodiment of a fiber optic cable having an open window in accordance with the principles of the present disclosure.
Figure 3:
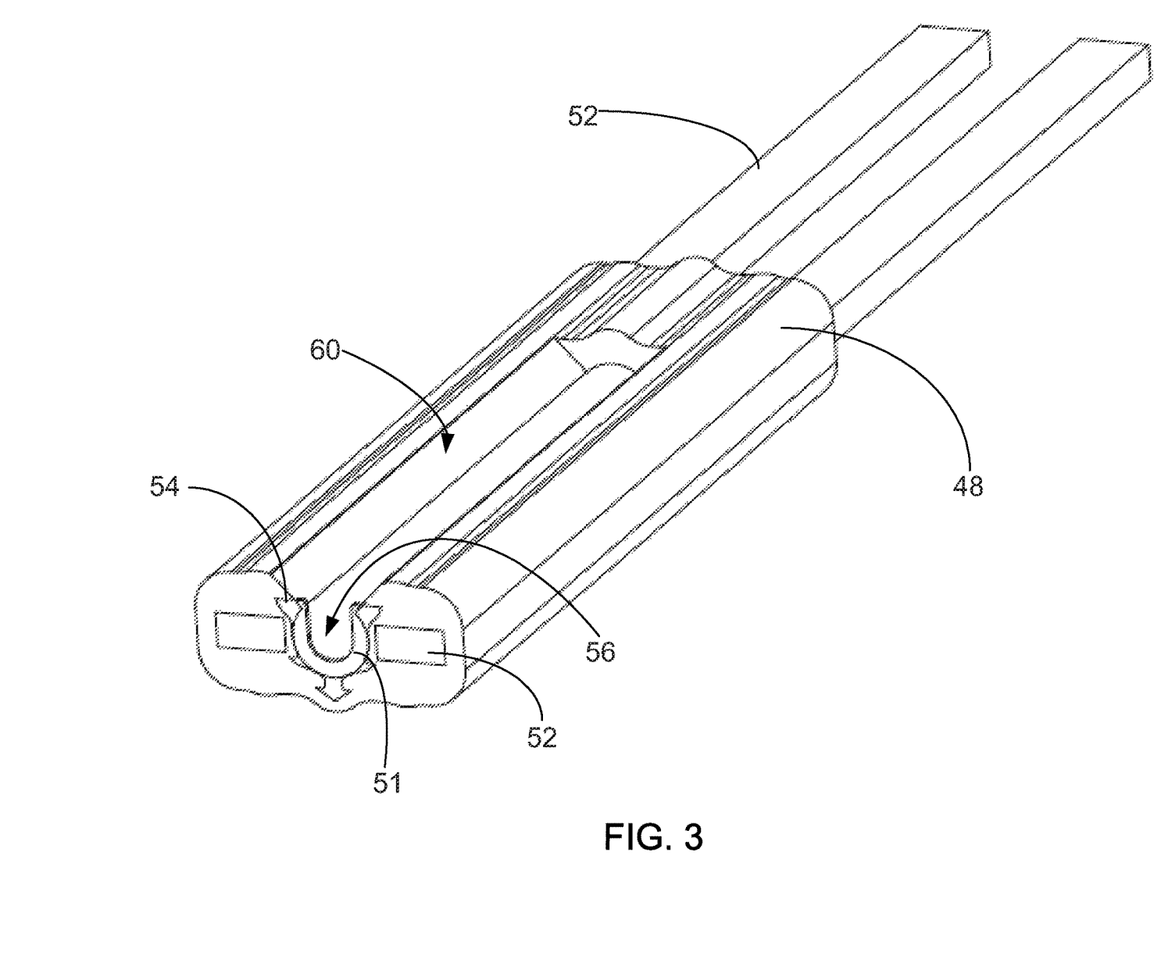
FIG. 3 is an isometric, cross-sectional view of an embodiment of the fiber optic cable illustrated in FIG. 2 in accordance with the principles of the present disclosure.
Figure 4:
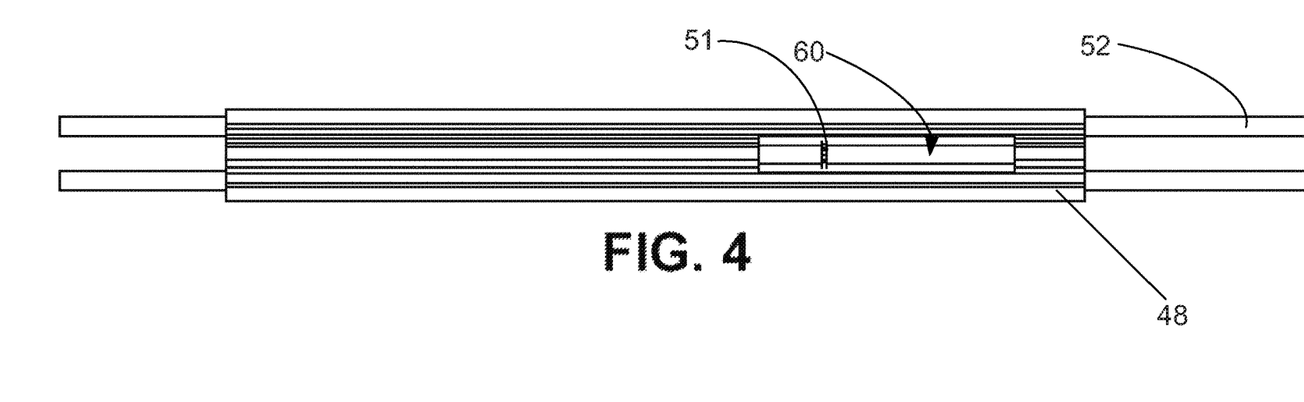
FIG. 4 is a top view of an embodiment of a fiber optic cable having an open window in accordance with the principles of the present disclosure.
Figure 5:
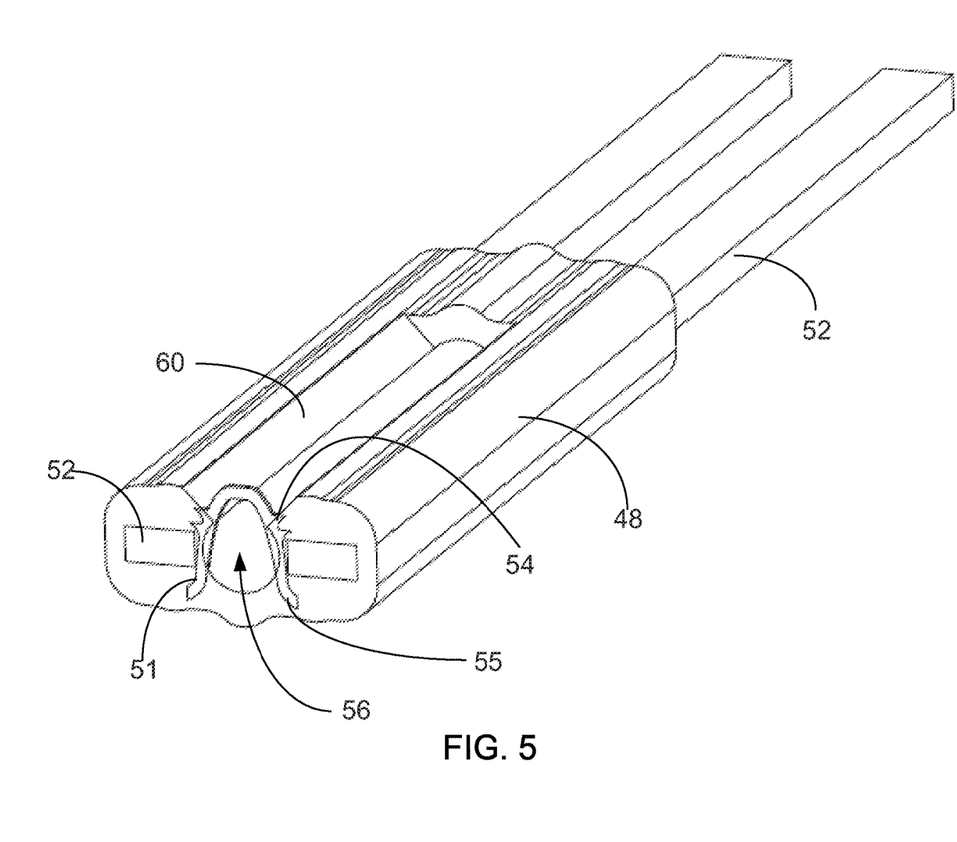
FIG. 5 is an isometric, cross-sectional view of an embodiment of the fiber optic cable illustrated in FIG. 4 in accordance with the principles of the present disclosure.
Figure 6:
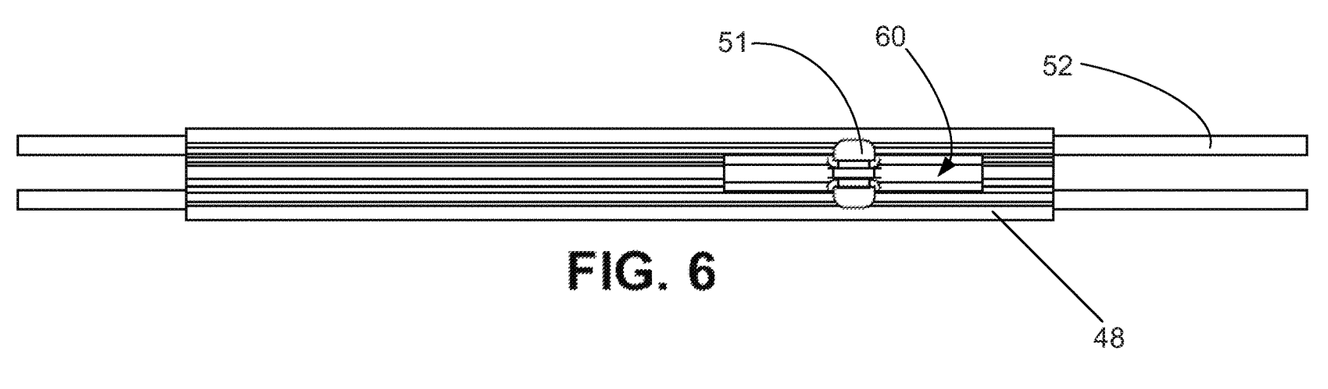
FIG. 6 is a top view of an embodiment of a fiber optic cable having an open window in accordance with the principles of the present disclosure.
Figure 7:
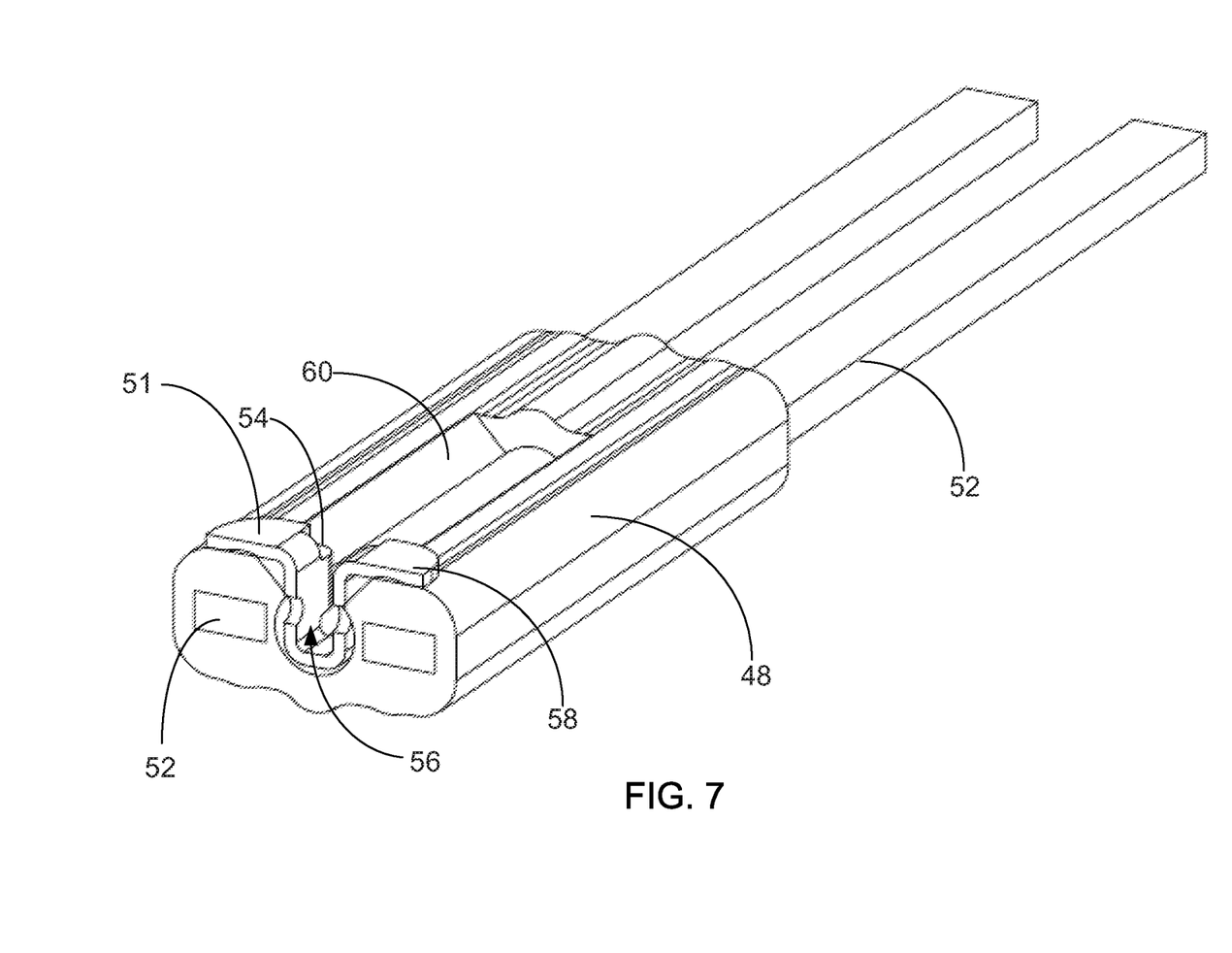
FIG. 7 is an isometric, cross-sectional view of an embodiment of the fiber optic cable illustrated in FIG. 6 in accordance with the principles of the present disclosure.

FIGS. 2, 4, and 6 illustrates a top view of an embodiment of a fiber optic cable 46 having an open window 60. FIGS. 3, 5, and 7 illustrate a cross-sectional view of an embodiment of a fiber optic cable 46. FIGS. 2, 4, and 6 illustrate an anchor mechanism 51 shown in the open window 60 of the fiber optic cable 46. The anchor mechanisms 51 in FIGS. 2, 4, and 6 are each a view of a different locking device. FIGS. 3, 4, and 5 each show an isometric, cross-section view of the different locking devices illustrated in FIGS. 2, 4, and 6. For example, the locking devices illustrated in FIGS. 3, 4, and 5 show different embodiments of a clip that has one or more catches 54. Catches 54 embed into the intermediate structure, such as the cable jacket 48, and/or the at least one strength structure 52 to lock the clip into place in the open space within the fiber optic cable 46. In some embodiments, the clips further include a biasing member. In some embodiments the biasing member biases the one or more catches 54 into the intermediate structure and/or the at least one strength structure 52. In other embodiments, the anchor mechanism 51 further includes the use of adhesive to lock the at least one optical fiber 50 into place within the fiber optic cable 46.

For example, the clip illustrated in FIGS. 2 and 3 has an open portion 56 that opens toward the open window 60. Further, the clip illustrated in FIGS. 2 and 3 has five catches 54 that embed into the cable jacket 48.

The clip illustrated in FIGS. 4 and 5 has an open portion 56 that opens away from the open window 60. Further, the clip illustrated in FIGS. 4 and 5 has four catches 54 that embed into the cable jacket 48. The clip illustrated in FIGS. 4 and 5 also include a biasing member. The biasing member is inherent to the clip and biases or pushes curved ends 55 and the catches 54 of the clip into the cable jacket 48.

The clip illustrated in FIGS. 6 and 7 has an open portion 56 that opens toward the open window 60. Further, the clip illustrated in FIGS. 6 and 7 has two catches 54 that embed into the cable jacket 48. The clip illustrated in FIGS. 6 and 7 also include a biasing member for embedding the clip and the catches 54 into the cable jacket 48. Additionally, the clip illustrated in FIGS. 6 and 7 include two wings or clasps 58 for anchoring the clip into a position within the cable jacket 48.

Numerous other changes may be made which will readily suggest themselves to those skilled in the art and which are encompassed in the spirit of the disclosure and as defined in the claims. While various embodiments have been described for purposes of this disclosure, various changes and modifications may be made which are well within the scope of the present disclosure.

The invention claimed is:

1. A cable assembly comprising:
a fiber optic cable including at least one optical fiber contained within a conduit of the fiber optic cable, the fiber optic cable also including at least one strength structure for providing tensile reinforcement to the fiber optic cable, the at least one strength structure extending along the conduit of the fiber optic cable; and
an anchoring location for anchoring the at least one optical fiber within the fiber optic cable, the anchoring location being positioned adjacent to where the at least one strength structure extends, the anchoring location including adhesive within the conduit for fixing the at least one optical fiber relative to the conduit of the fiber optic cable.

2. The cable assembly of claim 1, wherein the anchoring location prevents an axial load on the at least one optical fiber from transferring across the anchoring location.

3. The cable assembly of claim 1, wherein the adhesive is epoxy.

4. The cable assembly of claim 1, wherein the anchoring location includes a deformed portion of the conduit.

5. The cable assembly of claim 4, wherein the conduit is a cable jacket.

6. The cable assembly of claim 1, further comprising an anchoring member that extends into the conduit and cooperates with the adhesive to anchor the at least one optical fiber relative to the conduit.

7. The cable assembly of claim 1, wherein the adhesive is injected into the conduit.

8. The cable assembly of claim 1, wherein the anchoring location anchors the at least one optical fiber directly to the at least one strength structure at the anchoring location.

9. The cable assembly of claim 1, wherein the at least one strength structure includes a fiber reinforced polymer rod.

10. A fiber optic connector and cable assembly comprising:
a fiber optic connector including a connector housing having a distal end and a proximal end, and a ferrule assembly adjacent the distal end of the connector housing, wherein the ferrule assembly is mounted at least partially within the fiber optic connector;
a fiber optic cable including at least one optical fiber contained within a conduit of the fiber optic cable, the fiber optic cable also including at least one strength structure for providing tensile reinforcement to the fiber optic cable, the at least one strength structure extending along the conduit of the fiber optic cable, the at least one optical fiber extending through a fiber passage of the fiber optic connector from the proximal end of the connector housing to the distal end of the connector housing; and an anchoring location for anchoring the at least one optical fiber within the fiber optic cable, the anchoring location being positioned adjacent to where the at least one strength structure extends, the anchoring location including adhesive within the conduit of the fiber optic cable for fixing the at least one optical fiber relative to the conduit of the fiber optic cable, the anchoring location being spaced proximally from the proximal end of the connector housing.

11. The fiber optic connector and cable assembly of claim 10, wherein the anchoring location is spaced about 5 inches to about 3 feet away from the proximal end of the connector housing.

12. The fiber optic connector and cable assembly of claim 10, wherein the anchoring location is spaced about 1 foot to about 2 feet away from the proximal end of the connector housing.

13. The fiber optic connector and cable assembly of claim 10, wherein the adhesive is epoxy.

14. The fiber optic connector and cable assembly of claim 10, wherein the anchoring location includes a deformed portion of the conduit.

15. The fiber optic connector and cable assembly of claim 14, wherein the conduit is a cable jacket.

16. The fiber optic connector and cable assembly of claim 10, further comprising an anchoring member that extends into the conduit and cooperates with the adhesive to anchor the at least one optical fiber relative to the conduit.

17. The fiber optic connector and cable assembly of claim 10, wherein the adhesive is injected into the conduit.

18. The fiber optic connector and cable assembly of claim 10, wherein the anchoring location anchors the at least one optical fiber directly to the at least one strength structure at the anchoring location.

19. The fiber optic connector and cable assembly of claim 10, wherein the at least one strength structure includes a fiber reinforced polymer rod.

* * * * *